Patented Mar. 11, 1947

2,417,238

UNITED STATES PATENT OFFICE 2,417,238

POLYMERIZATION OF ALPHA-METHYLENE MONOCARBOXYLIC ACID ESTERS

Robert Edward Christ, Elizabeth, and Barnard M. Marks, Newark, N. J., assignors to E. I. du Pont de Nemours & Company, Wilmington, Del., a corporation of Delaware No Drawing. Application August 26, 1943, Serial No. 500,136

8 Claims. (Cl. 260—83)

This invention relates to the polymerization of alpha-methylene monocarboxylic acid esters and, more particularly, to the polymerization of such compounds in bulk to form massive castings.

The casting of polymerizable alpha-methylene unsaturated monocarboxylic acid esters such as methyl methacrylate, to form shaped articles is associated with a number of difficulties. This is especially true in the casting of articles possessing a substantial cross sectional area, i. e., massive castings, because the large shrinkage in volume and the liberation of much exothermic reaction heat during the course of polymerization tend to produce voids or bubbles in the cast articles.

The casting of these alpha-methylene monocarboxylic acid esters to form useful structural bodies is most expediently carried out by forming a viscous syrup of the polymerizable ester, charging a mold with this syrup, and then subjecting the contents of the mold to further polymerization conditions whereby the solid, cast body is obtained. The syrup-formation stage of this casting procedure serves to allow a portion of the exothermic heat of reaction to be evolved and a portion of the increase in density, or shrinkage, to occur prior to the actual casting operation. Obviously, the extent of polymerization and polymer content of the syrup should be as great as possible in order that these heat and density factors may be mitigated to the fullest extent. Thus, the higher the polymer content of the syrup charged into the mold, the lower will be the amount of heat evolved and volume shrinkage occurring during the final polymerization or casting in the mold. However, the viscosity of the casting syrup must not be so great as to prevent efficient handling, e. g., filtering and pouring. Furthermore, the casting syrup must not possess the tendency to form jellyfish-like bodies throughout its entirety prior to being charged into a mold.

Heretofore no means have been known for producing a polymeric syrup of an alpha-methylene monocarboxylic acid ester which possessed a polymer content sufficiently high to mitigate the discussed heat evolution and density increase factors to a desirable extent and yet which did not possess other undesirable features.

Another factor of importance in the production of massive castings is the rate at which the polymerizable ester polymerizes while in the mold. Thus, although it is possible during the syrup-formation stage to absorb a large part of the total heat of polymerization, the remaining exothermic heat will suffice to prevent the formation of a satisfactory casting if this heat be evolved at an unduly rapid rate. Hence, since it is practically impossible to maintain isothermal conditions throughout a massive casting due to the poor heat conductivity of these polymeric materials, the temperature at the center of the polymerization mass may rise as high as the depolymerization temperature of the polymer if the reaction heat be evolved within a relatively short period of time. These temperature surges are the main cause of formation of voids in the cast article.

An object of the present invention is to provide means whereby polymerizable materials comprising predominantly alpha-methylene monocarboxylic acid esters may be cast into structural bodies. More specifically, it is an object of the invention to provide a method whereby such esters may be polymerized to yield massive castings possessing no voids or other internal flaws. Further objects include the provision of a method for preparing high polymer content polymeric syrups of such esters which will polymerize smoothly and evenly when subjected to further polymerization conditions, and the provision of a catalyst for the accomplishment of such polymerizations. Other objects will be apparent from the description of the invention given hereinafter.

The above objects are accomplished according to the present invention by polymerizing alpha-methylene unsaturated monocarboxylic acid esters in bulk to form shaped articles, in the presence of a catalyst mixture consisting of an organic-peroxy compound, sulfur dioxide, and a third component from the group consisting of methallyl compounds and acetals. The invention further comprises adding the catalyst mixture to a monomeric alpha-methylene monocarboxylic acid ester, subjecting the monomer to polymerization conditions to form a syrup of partially polymerized ester, and then pouring said syrup into a mold and subjecting the same further to polymerization conditions until polymerization of the ester is complete.

High polymer content, low viscosity syrups for use in casting and the like may be obtained through the use of polymerization inhibitors (together with catalysts such as benzoyl peroxide), but such a syrup fails to polymerize completely and produces castings possessing soft spots due to the presence of incompletely polymerized material. Further, the use of the conventional catalysts employed by the art for the polymerization of the herein considered esters in amounts suitable for the production of massive castings generally causes the polymerizing mass to go through a long induction period and then to polymerize very rapidly with the evolution of much heat and its attendant difficulties.

It has now been discovered that through the use of the above catalyst mixture it is possible to produce a syrup containing a high polymer content for a given viscosity and which will react smoothly and completely to produce massive castings free from internal voids and which are substantially homogeneous throughout with regard to completeness of polymerization. The catalyst mixture serves to produce syrups of high polymer content which polymerize smoothly and completely as though the catalyst served as a polymerization governor. That is, the catalyst mixture causes the polymerizable material to polymerize without any substantial induction period but at the same time prevents the polymerization from proceeding with undue rapidity. Furthermore, the syrups of the present invention continue to polymerize smoothly even at temperatures as low as 0° C.

The following examples in which all proportions are by weight unless otherwise noted, illustrate specific embodiments of the invention:

Example I

A mixture of the following:

| | Parts |
|---|---|
| Monomeric methyl methacrylate | 1,000 |
| 1,3-dioxolane | 1.00 |
| A 5% solution of sulfur dioxide in methyl methacrylate monomer (0.005%) | 1.00 |
| A 6% solution benzoyl peroxide in methyl methacrylate monomer (0.005%) | 0.88 | is placed in a suitable vessel and heated with occasional stirring for 78 minutes. At the end of which time the temperature of the mixture is 87° C., the viscosity, as measured at 25° C., is 1.5 poises, and the polymeric content is 6.0%. The syrup thus formed is then cooled from this temperature to 21° C. over a period of 185 minutes. At this point the viscosity of the mixture is 40 poises (25° C.) and the polymeric content is 12.0%. The syrup is then filtered and charged into a suitable mold which is placed in a water-filled autoclave. The polymerization is completed by heating to 50° C. and a pressure of 150 lbs. per square inch maintained for 16 hours. After removing the casting from the mold it is tempered by heating for seven days at 20° C. to 30° C., then one day at 70° C., and finally one day at 100° C. The casting exhibits an average hardness of 71 (Rockwell H scale). The casting is completely free of voids or bubbles.

Example II

A mixture of the following:

| | Parts |
|---|---|
| Methyl methacrylate monomer | 540 |
| Styrene monomer | 60 |
| A 5% solution of sulfur dioxide in methyl methacrylate monomer | 1.2 |
| A 3% solution of benzoyl peroxide in methyl methacrylate monomer | 3.0 |
| 1,3-dioxolane | 9.0 |

Contained in a suitable vessel is heated for 185 minutes at 82° C. at the end of which time it has been transformed into a thick viscous syrup having a viscosity of 130 poises (25° C.) and a refractive index of 1.4390 (25° C.). This syrup is poured into a suitable mold and polymerized by heating for 16 hours at 50° C. in an autoclave under a pressure of 150 lbs. per square inch. The resulting clear casting exhibits the following properties:

| | |
|---|---|
| Hardness (Rockwell H scale) | 58 |
| Softening temperature °C | 90 |
| Tensile strength (lbs./sq. in.) | 6,375 |
| Flexural strength (lbs./sq. in.) | 13,000 |
| Impact strength (Charpy) | 0.44 |

The casting is completely free of voids or bubbles.

Example III

A mixture of the following:

| | Parts |
|---|---|
| Monomeric methyl methacrylate | 900 |
| Dibutyl phthalate | 100 |
| Benzoyl peroxide | 0.06 |
| Sulfur dioxide | 0.05 |
| 1,3-dioxolane | 0.45 |

Is charged into a jacketed reaction vessel and heated with intermittent agitation until the viscosity of the mixture has reached approximately 2 poises. At this point the syrup formed is withdrawn from the kettle and charged into a mixing vessel where it is mixed with 192 parts of phenyl iodide. After solution of the phenyl iodide in the syrup is complete, the mixture is withdrawn from the mixing vessel, passed through a filter, and finally poured into molds. The contents of the molds are then subjected to polymerization for 16 hours at 50° C. and 150 lbs. per square inch pressure. The cast products thus produced are completely homogeneous with respect to physical properties, free of any voids, and substantially opaque to X-ray radiations due to the presence of the phenyl iodide.

Example IV

The process of Example I is repeated but 10.0 parts of methallyl chloride is substituted for the 1.00 part of 1,3-dioxolane of Example I. The resulting massive casting is completely free of voids or bubbles and possesses an average hardness of 60 (Rockwell H scale). The polymeric syrup produced in this Example possessed a polymer content of approximately 55% when charged into the casting cell.

It will be understood that the above examples are merely illustrative and that the invention broadly comprises polymerizing an alpha-methylene monocarboxylic acid ester in bulk to form a shaped article, in the presence of the herein considered catalyst mixture. More particularly, the invention contemplates subjecting the monomeric ester containing the catalyst mixture to polymerization conditions to form a syrup of polymer dissolved in monomer and then disposing this syrup in a mold and completing polymerization of the syrup to obtain a cast article.

The invention is applicable generally to polymerizable alphamethylene unsaturated monocarboxylic acid esters, either singly or in mixtures of two or more; also, it is applicable to a mixture of these esters with other polymerizable compounds such as styrene, vinyl acetate, methacrylic anhydride, methacrylic acid, acrylonitrile, diethylmaleate, vinyl chloride, methyl vinyl ketone, dimethyl itconate, divinyl ether, acrolein, isoprene, vinyl esters, allyl and diallyl esters, and vinyl ketones, provided the weight of the addenda represents not greater than about 30% of the weight of total mixture.

Among the esters suitable for use in this invention may be mentioned, methyl methacrylate, ethyl methacrylate, methoxy methyl methacrylate, isobutyl methacrylate, octyl methacrylate, phenyl methacrylate, ethylene and polyethylene glycol dimethacrylates, methyl acrylate, methyl alpha-chloroacrylate, ethylene glycol diacrylate, methallyl methacrylate, and the like. The esters of acrylic, alpha-chloroacrylic, and methacrylic acids form a group which are all polymerizable and adapted to be used in this invention.

The organic-peroxy compounds which constitute one component of the catalyst mixture, are those containing the peroxygen linkage —O—O—. These include such materials as benzoyl peroxide, acetyl peroxide, benzoyl acetyl peroxide, diethyl peroxide, succinyl peroxide, peracetic acid and the like. Aromatic diacyl peroxides and, in particular, benzoyl peroxide are preferred. The exact concentration of the peroxy compound employed in the catalyst combination will depend to some extent upon the specific compound used and upon the conditions under which the syrup formation and casting are conducted. Since high concentrations of the peroxy compound cause the syrup preparation steps of the indicated process to proceed too rapidly for efficient handling, it is preferable to maintain the concentration of the same within the limits of 0.0025% to 0.5% by weight of the monomeric material.

The amount of sulfur dioxide employed in the combination catalyst of this invention is dependent to some extent upon the exact polymerizable monomers employed. However, it is preferred that the concentration of the same should be within the limits of 0.001% to 0.05% by weight of the monomeric material.

The third component of the catalyst mixture may be methallyl chloride or methallyl alcohol although an acetal, particularly a cyclic acetal is preferred. This component should be a liquid and compatible with both the monomeric material and the final polymerized product in the proportions employed. The specific cyclic acetal, 1,3-dioxolane, appears to be the best adapted for use in the catalyst mixture under most conditions but other dioxolanes such as 2-methyl-1,3-dioxolane, alpha-vinyl-1,3 dioxolane, 2-phenyl-1,3-dioxolane and higher dioxolanes which may, for example, be obtained from ethylene glycol and diethyl ketone, and higher substituted aldehydes, are suitable. The proportion of this added third ingredient may be varied depending upon polymerization conditions, and the particular compound used, but 0.01% to 1.5% based on the weight of the monomer is preferred.

The components of the combination catalyst may be mixed with the polymerizable monomeric materials in any known manner. However, it has been found convenient to measure and add the sulfur dioxide and the peroxy compound in the form of a solution of which the monomeric polymerizable material constitutes the solvent.

Plasticizers, dyes, fillers and the like may be incorporated in the massive castings of the present invention by adding the same to the monomeric materials prior to polymerization or these materials may be added to the polymeric syrup at any time previous to the casting of said syrups in a mold.

An advantage of the present invention is that it provides a very economical and practical means of preparing a readily pourable casting syrup of exceptionally high polymer content with all of the obvious attendant benefits thereof. A further advantage is that this is accomplished without danger of discoloration of the final product or obtaining a casting having soft spots due to the presence of incompletely polymerized material. Moreover, through the use of the catalyst mixture of this invention, monomeric esters may be polymerized without any prolonged induction period and yet the polymerization proceeds smoothly to completion but not with uncontrolled rapidity.

As many apparently widely different embodiments of this invention may be made without departing from the spirit and scope thereof, it is to be understood that the invention is not limited to the specific embodiments thereof except as defined in the appended claims.

We claim:
1. Process of casting methyl methacrylate to form shaped articles, which process comprises subjecting monomeric methyl methacrylate in bulk to polymerizing conditions in the presence of a catalyst mixture consisting, by weight of said methyl methacrylate, of 0.0025–0.5% of an organic-peroxy compound, 0.001%–0.05% of sulfur dioxide, and 0.01%–1.5% of a liquid 1,3-dioxolane.

2. Process of casting methyl methacrylate to form shaped articles, which process comprises subjecting monomeric methyl methacrylate in bulk to polymerizing conditions in the presence of a catalyst mixture consisting, by weight of said methyl methacrylate, of 0.0025%–05% of an organic-peroxy compound, 0.001%–0.05% of sulfur dioxide, and 0.01%–1.5% of 1,3-dioxolane.

3. Process of casting methyl methacrylate to form shaped articles, which process comprises subjecting monomeric methyl methacrylate in bulk to polymerizing conditions in the presence of a catalyst mixture consisting, by weight of said methyl methacrylate, of 0.0025%–0.5% of an organic-peroxy compound, 0.001%–0.05% of sulfur dioxide, and 0.01%–1.5% of a liquid 1,3-dioxolane, to form a syrup of partially polymerized methyl methacrylate, pouring said syrup into a mold, and thereafter subjecting the syrup further to polymerizing conditions until polymerization of said methyl methacrylate is complete.

4. Process of casting methyl methacrylate to form shaped articles, which process comprises subjecting monomeric methyl methacrylate in bulk to polymerizing conditions in the presence of a catalyst mixture consisting, by weight of said methyl methacrylate, of 0.0025%–0.5% of an organic-peroxy compound, 0.001%–0.05% of sulfur dioxide, and 0.01%–1.5% of 1,3-dioxolane, to form a syrup of partially polymerized methyl methacrylate, pouring said syrup into a mold, and thereafter subjecting the syrup further to polymerizing conditions until polymerization of said methyl methacrylate is complete.

5. A high polymer content, low viscosity syrup for casting, said syrup comprising a partially polymerized compound from the group consisting of the esters of acrylic, alpha-chloroacrylic, and methacrylic acids, and a catalyst mixture consisting, by weight of said compound, of 0.0025%–0.5% of an organic-peroxy compound, 0.001%–0.05% of sulfur dioxide, and 0.01%–1.5% of a liquid 1,3-dioxolane.

6. Process of casting polymerizable compounds to form shaped articles, which process comprises subjecting a polymerizable compound from the group consisting of the esters of acrylic, alpha-chloroacrylic, and methacrylic acids, in bulk to polymerizing conditions in the presence of a catalyst mixture consisting, by weight of said compound, of 0.0025%–0.5% of an organic-peroxy compound, 0.001%–0.05% of sulfur dioxide, and 0.01%–1.5% of a liquid 1,3-dioxolane.

7. Process of casting polymerizable compounds to form shaped articles, which process comprises subjecting a polymerizable compound from the group consisting of the esters of acrylic, alpha-chloroacrylic, and methacrylic acids, in bulk to polymerizing conditions in the presence of a catalyst mixture consisting, by weight of said compound, of 0.0025%–0.5% of an organic-peroxy compound, 0.001%–0.05% of sulfur dioxide, and 0.01%–1.5% of 1,3-dioxolane.

8. A high polymer content, low viscosity syrup for casting, said syrup comprising partially polymerized methyl methacrylate and a catalyst mixture consisting, by weight of said ester, of 0.0025%–0.5% of an organic-peroxy compound, 0.001%–0.05% of sulfur dioxide, and 0.01%–1.5% of a liquid 1,3-dioxolane.

ROBERT EDWARD CHRIST.
BARNARD M. MARKS.

REFERENCES CITED

The following references are of record in the file of this patent:

UNITED STATES PATENTS

| Number | Name | Date |
|---|---|---|
| 2,264,376 | Hiltner et al. | Dec. 2, 1941 |
| 2,324,935 | Kautter | July 20, 1943 |
| 2,097,263 | Strain | Oct. 26, 1937 |
| 2,189,529 | Carother et al. | Feb. 6, 1940 |
| 2,187,081 | Hodgins et al. | Jan. 16, 1940 |